(12) United States Patent
Kaulbach et al.

(10) Patent No.: US 6,541,588 B1
(45) Date of Patent: Apr. 1, 2003

(54) TETRAFLUOROETHYLENE/ HEXAFLUOROPROPYLENE COPOLYMERS WITH HIGHER DRAWABILITY

(75) Inventors: Ralph Kaulbach, Emmerting (DE); Albert Killich, Burgkirchen (DE); Friedrich Kloos, Kastl (DE); Gernot Loehr, Burgkirchen (DE); Ludwig Mayer, Burgkirchen (DE); Erik Peters, Garching (DE); Thomas J. Blong, Woodbury, MN (US); Denis Duchesne, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/492,021

(22) Filed: Jan. 26, 2000

Related U.S. Application Data

(60) Provisional application No. 60/117,780, filed on Jan. 29, 1999.

(51) Int. Cl.[7] .................. C08F 214/26; C08F 214/28; C08F 214/18
(52) U.S. Cl. .................. 526/250; 526/247; 526/253; 526/254
(58) Field of Search ................. 526/250, 253, 526/254, 247

(56) References Cited

U.S. PATENT DOCUMENTS

| | | | |
|---|---|---|---|
| 2,946,763 A | 7/1960 | Bro et al. | |
| 3,085,083 A | 4/1963 | Schreyer | |
| 3,528,954 A | 9/1970 | Carlson | |
| 4,552,925 A | 11/1985 | Nakagawa et al. | ......... 525/200 |
| 4,626,587 A | 12/1986 | Morgan et al. | ............. 528/481 |
| 4,743,658 A | 5/1988 | Imbalzano et al. | ...... 525/326.4 |
| 5,231,154 A * | 7/1993 | Hung | ......................... 526/206 |
| 5,861,464 A * | 1/1999 | Goldmann | ............... 525/326.4 |

FOREIGN PATENT DOCUMENTS

| | | |
|---|---|---|
| DE | 2 613 642 | 10/1976 |
| DE | 2 613 795 | 10/1976 |
| DE | 2 710 501 | 9/1977 |
| DE | 195 47 909 A1 | 12/1995 |
| EP | 0 220 910 B1 | 5/1987 |
| EP | 0 222 945 B1 | 5/1987 |
| EP | 0 226 668 B1 | 7/1987 |
| EP | 0 423 995 * | 4/1991 |
| EP | 0 423 995 A1 | 4/1991 |
| EP | 0 457 255 B1 | 11/1991 |
| EP | 0 220 910 * | 9/1992 |
| EP | 0 591 888 B1 | 4/1994 |
| EP | 0 789 038 A1 | 8/1997 |
| GB | 1 210 794 | 10/1970 |
| WO | WO 94/05712 | 3/1994 |
| WO | 97/08239 * | 3/1997 |

OTHER PUBLICATIONS

*Modern Fluoropolymers*, Ed. By John Scheirs, Wiley & Sons, 1997, "High Performance Polymers for Diverse Applications", pp. 226, 227, 228; "Modified Polytetrafluoroethylene–the Second Generation" p. 241.

W. H. Tuminello in *Polymer Engineering and Science*, vol. 26, Oct., 1986, "Molecular Weight and Molecular Weight Distribution From Dynamic Measurements of Polymer Melts", p. 1339.

* cited by examiner

*Primary Examiner*—Fred Zitomer
(74) *Attorney, Agent, or Firm*—James V. Lilly; Brian E. Szymanski

(57) ABSTRACT

A tetrafluoroethylene/hexafluoropropylene copolymer with high drawability is provided. Also provided is a process employing the polymer and an article coated with the polymer.

9 Claims, No Drawings

TETRAFLUOROETHYLENE/ HEXAFLUOROPROPYLENE COPOLYMERS WITH HIGHER DRAWABILITY

This application claims priority from U.S. Serial No. 60/117,780 filed Jan. 29, 1999.

FIELD OF THE INVENTION

The invention relates to melt-processable tetrafluoroethylene (TFE)/hexafluoropropylene (HFP) copolymer melt pellets having an improved processability for wire and cable application and to a method of using this polymer to coat wire and cable conductors.

BACKGROUND

Melt processable copolymers with TFE and HFP are well known under the name FEP. As perfluorinated thermoplasts, such copolymers have unique end-use properties like chemical resistance, weather resistance, low flammability thermal stability and outstanding electrical properties. Like other thermoplasts, FEP is easily molded to coated wires, tubes, pipes, foils and films.

Because it has excellent thermal stability and is practically non-flammable, FEP is frequently used for plenum constructions to meet fire resistance requirements. It is also the natural choice in data transmission cables due to its excellent dielectric properties. See EP 0 423 995 A1.

High processing speeds are desired when wires and cables are extrusion coated. Such high extrusion rates are limited by the occurrence of melt-fracture like with many thermoplasts. Melt-fracture results in surface roughness and/or uneven wall thickness. To increase the extrusion speed the molecular weight distribution of the used copolymer is believed to be very broad as disclosed, for example, in U.S. Pat. No. 4,552,925 for FEP.

For substantially broadening of the molecular weight distribution, the copolymer is mostly used as a mixture of at least two FEP's with largely differing molecular weights. The molecular weights are often characterized by the melt viscosity or the melt flow index (MFI-value). The desired mixtures are often produced by polymerizing the components separately and mixing them in form of the latices, reactor beads or fluff before melt pelletizing. Thus the manufacturing of these mixtures is a cumbersome and costly process.

Other FEP-mixtures are disclosed in DE 2,613,642 and DE 2,613,795.

These mixtures were claimed to be advantageous for diminishing the foaming during the stabilization process of FEP. This process is carried out by treating the resin at high temperatures up to 400° C. preferably in presence of water vapour. By this process the thermally unstable endgroups, mostly COOH and CONH$_2$ groups (easily detected by IR-spectroscopy), are removed.

These mixtures have a very broad molecular weight distribution which according to conventional wisdom, results in an improved extrudability.

Removal of thermally unstable end-groups is required for the processing of FEP, in particular for wire-coatings. The decomposition reaction of the unstable endgroups, described in Modern Fluoropolymers, Ed. John Scheirs, Wiley & Sons 1997, p. 228 leads to bubbles and holes in the end-articles. Melt pelletizing of unstabilized polymer resins results in corrosion of the equipment used in the process and in metal contamination of the melt pellets. However, the stabilization process of DE 2,613,642 and DE 2,613,795 is very difficult to manage due to corrosion of the equipment because of the use of a water steam.

Metal contaminants are difficult to cope with. Such metal contaminants may result in degradation and decomposition of the copolymer at high processing temperatures. Decomposition generally leads to discoloration and degradation, and to a build up of die drools. Die drools are accumulations of molecular fractions of the polymer at the surface of the die exit. Die drools impair the coating processing. Also, cone breaks can occur. During the process of coating a wire, the molten polymer is extruded as a tube or sheath and drawn by vacuum onto the wire. Cone breaks are the discontinuities or breaks that occur during this process. Every time a cone break occurs, the coating process has to be re-initiated and one must wait for the system to reach equilibrium. Thus long processing times are more difficult to achieve. Productivity is diminished.

Furthermore, extrusion temperatures have to be kept as low as possible to counteract the decomposition reactions and resulting toxic off-gases, the rate of which substantially increases with elevated temperatures. On the other hand, lower extrusion temperatures result in higher melt-viscosities and thus an earlier onset of the melt fracture. Lowering the intrinsic melt viscosity by lowering the molecular weight results in poorer mechanical properties.

As a result, the material should be made more thermally stable not only by eliminating the thermally unstable end-groups but also by avoiding metal contaminants and Mw fractions which are more prone to shear and/or thermal degradation.

Another way to eliminate unstable endgroups is postfluorination as disclosed in, for example, GB 1 210 794, U.S. Pat. No. 4,743,658 and EP 0 457 255 B1. Generally, elemental fluorine diluted with nitrogen is used at elevated temperatures up to close to the onset of melting of the polymer. The polymer may be subjected to fluorination in form of melt pellets, agglomerates or fluff. Here, too, excessive metal contamination should be avoided.

EP 0 222 945 B1 discloses the fluorination of hardened agglomerates, there called granules.

The fluorination leads to perfluorinated endgroups whereas the humid heat treatment as mentioned above, mechanistically cannot result in a fully fluorinated polymer resin. It is believed that inserted double bonds are present in the backbone leading to an inherent thermal instability. These kinds of bonds may lead to a discoloration at long exposures to high temperatures.

There is another degradation reaction of FEP disclosed in U.S. Pat. No. 4,626,587. The onset of this reaction is supposed to occur by splitting the HFP diads in the middle of the chain at temperatures above the melting point. Such diads are formed at the radical polymerization by recombination of the correspondent polymer radicals as a termination step. The destruction of the diads at processing conditions leads to halving the molecular weight of these polymer chains and hence to negatively affecting the mechanical properties, and to formation of more unstable endgroups. As U.S. Pat. No. 4,626,587 teaches, such diads are destroyed by subjecting the material to very high shear rates at temperatures far above the melting point. This process also is very costly.

There is another process disclosed in EP 0 789 038 A1 to reduce the backbone instability. The process is disclosed to use relatively large amounts of a chain transfer agent to suppress termination of polymer radicals by recombination.

SUMMARY OF THE INVENTION

The invention provides a material for wire and cable coatings which can be processed at higher speeds and at higher temperatures for longer run times of the equipment. The invention furthermore provides a manufacturing process which is more economical and better controllable as to quality consistency. Still further, the invention provides a process for reducing die drool and the frequency of cone breaks during wire and or cable coating extrusion coating.

DETAILED DESCRIPTION

The polymer according to the invention comprises a copolymer of TFE and HFP. It has a HFP content in the range of 5 to 22 weight % (w %), preferably between 10 to 18 w %, a TFE content of between 95 to 78 wt %, preferably between 90 to 82 wt %, and optionally up to 3 mol % of a fluorinated monomer copolymerizable with HFP and TFE. The optional comonomer is preferably a perfluoroalkylvinylether as is disclosed in EP 0 789 038 and DE 2 710 501 C2. The monomer content is measured via IR-spectroscopy as described in U.S. Pat. No. 4,552,925. The polymers of the invention typically have a melting point between 240–275° C., preferably 245–265° C.

The polymer of the invention is essentially free of thermally unstable endgroups which are removed via postfluorination of the agglomerates. Essentially free of endgroups means less than 80 endgroups per million carbon atoms, preferably less than 40 endgroups and most preferably less than 30 endgroups per million carbon atoms. The material is essentially of high purity grade as to metals; that is the total amount of iron, chromium, nickel is less than 200 parts per billion (ppb), preferably less than 100 ppb.

The polymer of the invention used to coat wire and cable conductors has a very narrow molecular-weight distribution, i.e., a ratio of Mw to Mn of less than about 2 (Mw=weight average, Mn=number average molecular weight). This ratio may be as low as 1.5. This is in contrast to FEP-grades recommended for wire coatings with high extrudation rates where a broad molecular weight distribution is recommended. The broadness of the molecular weight distribution is measured according to a method published by W. H. Tuminello in Polym. Eng. Sci 26, 1339 (1986). For high speed wire extrusion the MFI of the polymer is $\geq 15$. Lower MFI's are useful for other applications such as foamed coaxial cable. This polymer is preferably essentially free of unstable endgroups. It most preferably is the polymer of the invention.

A melt pelletized copolymer according to the invention with a MFI-value of 24 and containing 15 w % HFP may be manufactured as described below. This polymer can be extruded with a wire coating extruder at, for example, 390° C. (735° F.) at a rate of 1500 feet/min over a run time of the equipment of 6 hours without exhibiting discoloration and without producing substantial amounts of die drools and with fewer cone-breaks in contrast to commercial FEP grades. The surprisingly good performance is not fully understood.

Despite a narrow molecular weight distribution high processing rates can be achieved. As has been discussed above, the art teaches that a broad molecular weight distribution is needed to achieve such high processing rates. It has now been discovered that a narrow molecular weight distribution performs better, thus overcoming a well established prejudice.

Furthermore, discoloration does not occur during processing. This is an indication of the absence of a decomposition reaction. The MFI-value of the extruded material practically does not change. The amount of IR-detectable endgroups does not increase. Both observations indicate that there is no significant chain degradation. This observation suggests that weak backbone linkages as HFP-diads (U.S. Pat. No. 4,626,587) are not present in the material.

The non-occurrence of discoloration together with these observations, namely the nearly unchanged MFI-value and the nearly unchanged amount of endgroups is evidence of the absence of a significant decomposition reaction even at higher processing temperatures. It is believed that this results in reduced die drools and the much reduced frequency of cone breaks. Hence, the copolymer according to the invention exhibits a surprisingly high thermal stability even under shear. As a result, the polymer of the invention can beneficially be used in other applications.

The evidence of the absence of a decomposition reaction is surprising and not fully understood. It is believed that metal contaminants, in particular heavy metals like Fe, Ni, Cr might induce a decomposition reaction. Indeed, the used material contained only less than 50 ppb of Fe+Ni+Cr ions as measured by neutron activation analysis. Thus the material according to the invention can be called a high purity grade.

The polymer of the invention may be made by the manufacturing process as described below.

The polymerization may be carried out in form of a radical aqueous emulsion polymerization as it is known in the art, (see U.S. Pat. No. 2,946,763). Ammonium or potassium persulfate may be used as initiators. As emulsifiers standard emulsifier like the ammonium salt of perfluorooctanoic acid may be used. Buffers like $NH_3$, $(NH_4)_2CO_3$ or $NaHCO_3$ can be incorporated in the recipe. Typical chain transfer agents like $H_2$, lower alkanes, methylene fluoride or methylene chloride can be used. Chloride and bromine containing chain transfer agent should be avoided. These components may cause strong corrosion at the fluorination process. Polymerization temperatures can range from 40–120° C., preferably 50–80° C.; polymerization pressures may range from 8–25 bar, preferably 10–20 bar. HFP is precharged and fed into the reactor according to the rules of copolymerization. (See for example, Modern Fluoropolymers, ed. John Scheirs, Wiley & Sons, 1997, p. 241). The preferred version of the polymerization recipe here is an alkali metal salt-free recipe.

Furthermore, it is preferred to carry out the copolymerisation without any chain transfer agents in contrast to EP 0 789 038 A1. Chain transfer agents intrinsically broaden the molecular weight distribution. The polymerization rate/time curves should have the shape as published in Modern Fluoropolymers, Ed. by Johns Scheirs, Wiley & Sons, 1997 p. 226. As hinted to in this paper, the Mw/Mn ratio can be easily calculated from the rate/time curves in absence of a chain transfer agent via eq. (6), p 230 and assuming that termination solely occurs via recombination. Recombination leads to a Mw/Mn ratio of 1.5 for small conversions. Termination primarily via chain transfer results in a Mw/Mn ratio of 2.

The radical polymerization also can be carried out in a non aqueous medium, like R 113, as disclosed in U.S. Pat. No. 3,528,954. The non aqueous process is not preferred because it is believed to also generate smaller amounts of high molecular weights due to the gel effect in this "suspension" polymerization. Weak back bone linkages (HFP-diads) are more likely to be generated by the gel effect. The occurrence of a gel effect at the aqueous emulsion polymerization is most unlikely to occur because propagation and termination take place on the surface of the latex particles.

The dispersion obtained from the polymerization is preferably mechanically coagulated with a homogenizer (see EP 0 591 888 B1) and agglomerated with a water immiscible organic liquid like gasoline, a technique well known in the art (see Modern Fluoropolymers, ed. by J. Scheirs, Wiley & Sons, 1997, p. 227). The agglomerates are free flowing spherical beads with a diameter of 0.5–2 mm. The free flowability is preferred for the technical reliability of carrying out the subsequent work up steps. The agglomerate is dried by first purging with nitrogen and then under moderate vacuum at temperatures up to 180° C.

Chemical coagulation may also be employed. However, it is generally done with acids. This is not preferred as it results in very high levels of metal contaminants at all subsequent work up steps.

The agglomerate may then be fluorinated at temperatures between 60–150° C., preferably at 100–140° C. with a mixture of fluorine in nitrogen. The mixture generally contains 10 w/% fluorine. Fluorination continues until at least 90–95% of the endgroups of the original agglomerate are eliminated. Higher fluorination temperatures can result in a difficultly controllable change of the MFI-value which can be up to 30%. This can result in a broadening of the molecular weight distribution and negatively effect performance. As a result, reproducibility is not achieved, thus negatively affecting quality and consistency of wires and cables coated with the polymer. Reaction times were not observed to be discernibly shortened by higher temperatures; thus higher fluorinating temperatures are not considered to be advantageous. Moreover higher temperatures can lead to presintering or even sintering of the agglomerate can cause a sticking of the material to the walls of the equipment. The fluorination is carried out in a tumble drier to keep the material in motion. Thus more homogeneous reaction conditions are achieved. The free flowable agglomerate has to be free of fines and mechanically stable enough to avoid producing too many fines at the after treatment. Fines may impair the reliability of operating the process. Hardening of the agglomerate as disclosed in EP 0 222 945 B1 is not required.

The fluorination of the agglomerate has two advantages. It is not a diffusion controlled reaction since the endgroups reside on the surface of the latex particles. Reaction times therefore are relatively short. Next the friable, not hardened agglomerate is soft enough to not scratch off metal contaminants from the wall of the tumble drier. Thus the level of metal contaminants is reduced. Both features do not hold for the fluorination of melt pellets. In this case the fluorination process requires higher temperatures and much longer reaction times to make allowance to the diffusion control of the reaction. Furthermore, the hard and sharp melt pellets scratch off a considerable amount of metal from the wall of the tumble drier. Increasing reaction times result in higher metal contamination. This contamination is difficult to remove. The level of metal contamination was observed to increase by up to 2 orders of magnitudes when the pellet process was used.

The fluorinated agglomerate is subsequently melt pelletized.

The agglomerate suffers from some disintegration during the drying and fluorination processes. Fines are produced resulting in uneven free flowing behaviour of the material. It is advantageous to compact the fluorinated agglomerate before melt pelletizing. Thus a more reliably constant feeding rate is achieved.

Melt pelletizing fluorinated agglomerates provides many advantages compared to the melt pelletizing of non fluorinated agglomerates. Melt pelletizing occurs practically without decomposition. The MFI-value practically stays unchanged. This observation suggests the essential absence of weak backbone linkages. The corrosion of the equipment is substantially reduced. The pick up of metal contamination thus is insignificant. The emission of gaseous decomposition chemicals at the die exit is significantly reduced (e.g., by 4 orders of magnitudes). Thus the whole process is safer to operate. Die drools are substantially reduced. Thus the process needs less attention. The color of the melt pellets does not exhibit any discoloration in contrast to the melt pellets originating from non fluorinated agglomerates which may leave the extruder. These nonfluorinated pellets are typically "coffee brown" in color.

The MFI value of the melt pellets manufactured via the described process is observed to only slightly increase by about 10% compared to the MFI value of the resin as polymerized. Thus quality consistency can be achieved more easily.

As described in DE 195 47 909 A1 the melt pellets are subsequently subjected to an aqueous treatment to remove the volatiles and COF-groups. Here too, the near-absence of gaseous decomposition chemicals and acidic endgroups reduce the corrosion of the stainless steel water treatment vessel considerably. Thus further heavy metal contamination is diminished. Furthermore, water soluble salts originating from the manufacturing process are removed. The amount of extractable fluoride ions is greatly diminished to less than 1 ppm.

Test Methods

The MFI value is measured according to ASTM D 1238 (DIN 53735) at 372° C. with a load of 5 kg. The MFI value can be converted to the value of the melt viscosity in 0.1 Pas (Poise) by dividing 53150 by the MFI value (g/min).

The HFP content is measured via FTIR-spectroscopy as disclosed in U.S. Pat. No. 4,552,925. The absorbances at the wave-numbers of 980 cm$^{-1}$ and 2350 cm$^{-1}$, respectively, are measured with a film of 0.05±0.01 mm in thickness which is formed at 350° C. with a FTIR-Nicolet Magna 560 FTIR spectrometer. The HFP content is calculated according to the following equation HFP content (w %)=$A_{980}/A_{2350} \times 3.2$.

The endgroups, —COOH, —COF, CONH$_2$, are determined via FTIR spectroscopy as disclosed in EP 226,668 B1 and U.S. Pat. No. 3,085,083. A film of a thickness of 0.1 mm which is formed at 350° C. is used together with a reference film of a material known to have none of the endgroups to be analyzed. A FTIR-Nicolet Magna 560 spectrometer was used using the interactive subtraction mode of the software. When the population of endgroups are reported herein, the sum of isolated and associated COOH-groups, CONH$_2$ and COF-groups are meant.

Melting points of the copolymers were determined by DSC by the method of ASTM D-4591-87 at a heating rate of 10 K/mill. The reported melting temperature is the peak temperature of the endotherm on the 2$^{nd}$ melting.

The broadness of the molecular weight distribution characterized by the Mw/Mn ratio was measured via rheological spectroscopy with an Advanced Rheometer Expansion System (ARES) supplied by Rheometric Scientific. Measurements were carried out at 372° C. and evaluated according to W. H. Tuminello, Polym. Eng. Sci., 26, 1339 (1986).

Metal contents were measured by extracting the samples with 3% HNO$_3$ for 72 hours at room temperature and subjecting the extract to atomic absorption spectroscopy.

The extractable fluoride ion content of the melt pellets was measured as disclosed in EP 0 220 910 B1. However, extraction was performed only with water.

EXAMPLE 1

A stainless steel 1500 l reactor was charged with 1000 l of deionized water containing 3 kg of the ammonium salt of perfluoro-octanoic acid. Air was removed by evacuation and purging with $N_2$. The reactor was heated to 70° C. and the temperature kept constant. 2 kg of 25% ammonia in water was added.

The vessel was pressurized with TFE and HFP to 17 bar such that the partial pressure of HFP was 12.5 bar. The polymerization was started by adding 1600 g of ammonium persulfate diluted in 5 l deionized water within 10 min. The pressure was kept constant by feeding a gaseous mixture of TFE/HFP into the reactor. The TFE/HFP weight ratio was 0.14. After 6 hours the reaction is stopped by interrupting the monomer feed. The monomers were vented off. The reactor was cooled to room temperature and discharged. The solid content of the polymer dispersion was 29%, the dispersion was practically free of coagulum. The MFI-value was 20 g/min. The HFP content of the copolymer was 13 w/%. The melting point was 255° C. The copolymer had 660 COOH endgroups per $10^6$ carbon atoms. Mw/Mn was measured to 1.7. A Mw/Mn value of 1.6 was calculated from the polymerization rate time curve.

The dispersion was coagulated with a homogenizer and agglomerated with gasoline. The agglomerate was washed three times with deionized water and dried for 6 hours at 180° C. in a tumble drier first by purging with nitrogen and then under vacuum.

The resulting agglomerate was divided into 2 parts. One part was subsequently melt-pelletized, water treated and dried. It had a coffee brown color. It was then fluorinated and again water treated to remove residual COF-endgroups. The discoloration disappeared. This sample is called A0. The material had 43 endgroups per million carbon atoms. The other part of the agglomerates was first fluorinated, melt pelletized and treated with water and dried. This sample is called A1 and had 18 endgroups per million carbon atoms.

At each processing step the content of iron, nickel and chromium was measured via the extraction method. Table 1 shows the results together with the amount of endgroups.

TABLE 1

Metal contaminations for samples A0 and A1, respectively, after the various work up steps. Agglomerate had 660 endgroups.
Sample A0: Fluorination of the Melt Pellets (Comparison)
Work Up Steps

| metal content [ppb] | agglomerate | melt pellets | water treated | fluorinated melt pellets | water treated melt pellets endproduct[*] |
|---|---|---|---|---|---|
| Fe | 10 | 247 | 198 | 892 | 550 |
| Ni | >10 | 41 | 22 | 56 | 21 |
| Cr | >10 | 38 | 19 | 71 | 27 |

[*] 43 endgroups per million carbon atoms

Sample A1: Fluorination of the Agglomerate (Invention)
Work Up Steps

| metal content [ppb] | agglomerate | fluorinated agglomerate | melt pellets | water treated melt pellets endproduct[*] |
|---|---|---|---|---|
| Fe | 10 | 14 | 18 | 14 |
| Ni | >5 | >5 | >5 | >5 |
| Cr | >5 | >5 | >5 | >5 |

[*] 18 endgroups per million carbon atoms

The fluorination was carried out in a 300 l stainless steel tumble drier with a mixture of 10% fluorine in nitrogen at 140° C. for sample A0 and at 100–140° C. for sample A1, respively. Details are given in Table 2. The fluorine mixture had to be replaced several times, so called refills. At the end of the reaction excess fluorine was removed by blowing air through the reactor. Excess fluorine was adsorbed by passing the air stream through a bed of $Al_2O_3$ granules and through a washer containing an aqueous slurry of $CaCO_3$.

TABLE 2

Fluorination Conditions for Samples A0 and A1, respectively.

| sample | material form | reaction temp. ° C. | Number[*] of refills | overall reaction time [h] | final[**] number of endgroups |
|---|---|---|---|---|---|
| A0 | Melt pellets | 200 | 16 | 8.5 | 43 |
| A1 | Agglomerate | 140 | 7 | 4 | 12 |

[*] refills after each 0.5 h, except the last one 1 h
[**] endgroups are the sum of COOH, COF and $CONH_2$ per million carbon atoms Water treatment (see DE 195 47 909 A1) was carried out in a 1000 l stainless steel reactor. 200 kg of melt pellets and 400 l deionized water containing 1 l 25% aqueous ammonia were charged into the reactor. The reactor was heated up to 100° C. and kept at this temperature for 4 hours for the nonfluorinated melt pellets and for 1 hour for the fluorinated melt pellets. These reaction times were required to bring the COF endgroups below 5 ppm. The reactor was cooled by replacing the water 2 times. Drying was achieved by blowing hot air through the reactor. The melt pellets had an extractable fluoride ion content of 0.1 ppm.

EXAMPLE 2

Sample A11 was run through a wire coating extruder under two different sets of conditions together with a commercial product designated C1. Sample A11 was manufactured like A1 but had a MFI value of 24 g/min. A11 is a reproduction of A1 as to the polymerization and work up. It had 28 endgroups and an iron content of 18 ppb. The Mw/Mn ratio was measured to be 1.6. The calculated value was 1.7. The extractable fluoride ion content was 0.2 ppm.

The coating conditions are listed in Tab. 3.

TABLE 3

Coating Performance of the material according to the invention in comparison to a commercial product C1 and to sample A0

| Run # | 1 | 2 | 3 |
|---|---|---|---|
| Sample | A11 | A11 | C1 |
| MFI g/min | 24 | 24 | 21 |
| Copper Wire temp. (F.) | 350 | 380 | 350 |
|  | 176° C. | 193° C. | 177° C. |
| Cone Length (inch) | 2.0 | 1.5 | 2.0 |
| Die Temperature (F.) | 716 | 735 | 716 |
|  | 380° C. | 391° C. | 380° C. |
| Extruder Speed (rpm) | 21.3 | 24.7 | 18.5 |
| Line Speed (fpm) | 1710 | 2006 | 1402 |
|  | 521 mps | 611 mps | 427 mps |

Temperature profiles, not given in the tab., were slightly adjusted to maximize the line output while maintaining the deviation of the insulation excentricity between 0.0003 and 0.0007 inches.

Runs 1–2 did not show noticeable die drools and no cone-breaks during the run time. Run 3 showed significant die drool and cone-breaks during equivalent run time. When C1 was aged above its melt temperature (i.e., about 250° C. it showed a noticeable brownish discoloration.

EXAMPLE 3

Samples A11, A12 and a commercial products were run through a slightly different wire-coating extruder.

The coating conditions are listed in Tab. 4

TABLE 4

Coating Performance of the material according to the invention in comparison to 2 commercial products

| Run # | 1 | 2 |
|---|---|---|
| Sample | A11/A12 | C2 |
| MFI g/min | 24/23 | 25 |
| Copper wire temp. (F.) | 380/375 | 350 |
|  | 193° C./190° C. | 177° C. |
| Cone Length (inch) | 2.0 | 2.0 |
|  | 5.1 cm | 5.1 cm |
| Die temp. (F.) | 760 | 760 |
|  | 404° C. | 404° C. |
| Extruder Speed (rpm) | 42.5 | 32.0 |
| Line Speed (fpm) | 1700 | 1390 |
|  | 518 mps | 415 mps/417 mps |

Temperature profiles were adjusted to maximize the line output while maintaining the deviation of the insulation eccentricity between 0.0003 and 0.0007 inches (0.00076 and 0.0018 cm).

Run # 1 did not show noticeable die drool and exhibited only 2 cone-breaks during a period of 29 hours of extruding wire colors of blue, green, orange, brown and white.

Run # 2 showed considerable die drool and averaged 6–8 cone-breaks during a run period of 24 hours.

What is claimed:

1. A fluoropolymer comprising from 78 to 95 weight percent tetrafluoroethylene (TFE) and 5 to 22 weight percent hexafluoropropylene (HFP) and optionally up to 3 mol % of a further fluorinated monomer copolymerizable with TFE and HFP, said fluoropolymer having a ratio of its weight average molecular weight ($M_w$) to its number average molecular weight ($M_n$) of less than 2, and a melt flow index (MFI) of greater than or equal to 15.

2. A fluoropolymer according to claim 1 wherein the further fluorinated monomer is a perfluoroalkyl vinyl ether.

3. A fluoropolymer according to claim 1 wherein the polymer is essentially free from thermally unstable end groups.

4. An article comprising a conductor coated with the polymer of claim 1.

5. A fluoropolymer according to claim 1 having less than 220 parts per billion (ppb) of heavy metals.

6. A fluoropolymer according to claim 1 consisting of a copolymer of TFE and HFP.

7. A fluoropolymer according to claim 1 having a melting point in the range of from 240° C. to 275° C.

8. A fluoropolymer according to claim 1 that contains less than 80 thermally unstable endgroups per million carbon atoms.

9. A fluoropolymer according to claim 1 comprising a copolymer of from 82 to 90 weight percent TFE and from 10 to 18 weight percent of HFP.

* * * * *

UNITED STATES PATENT AND TRADEMARK OFFICE
CERTIFICATE OF CORRECTION

PATENT NO.     : 6,541,588 B1
DATED          : April 1, 2003
INVENTOR(S)    : Kaulbach, Ralph It is certified that error appears in the above-identified patent and that said Letters Patent is hereby corrected as shown below:

Column 3,
Line 44, delete "$\geqq$" and insert in place thereof -- $\geq$ --

Column 6,
Line 57, delete "K/mill" and insert in place thereof -- K/min --

Signed and Sealed this

Twenty-first Day of October, 2003

JAMES E. ROGAN
*Director of the United States Patent and Trademark Office*